Feb. 16, 1971   R. G. PALMER ET AL   3,563,100
AUTOMATIC SLIDE TRAY ADVANCING MECHANISM
Filed July 30, 1969

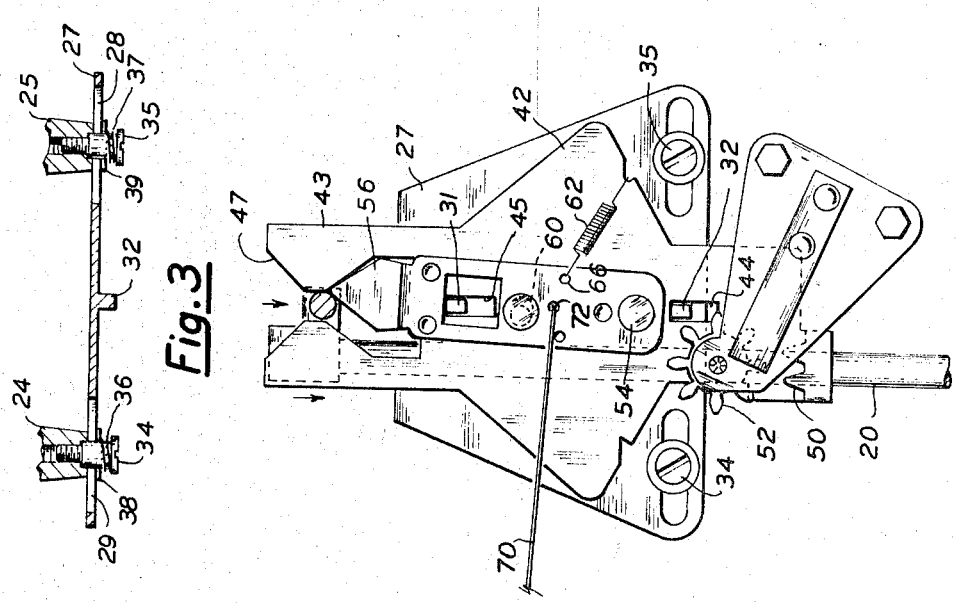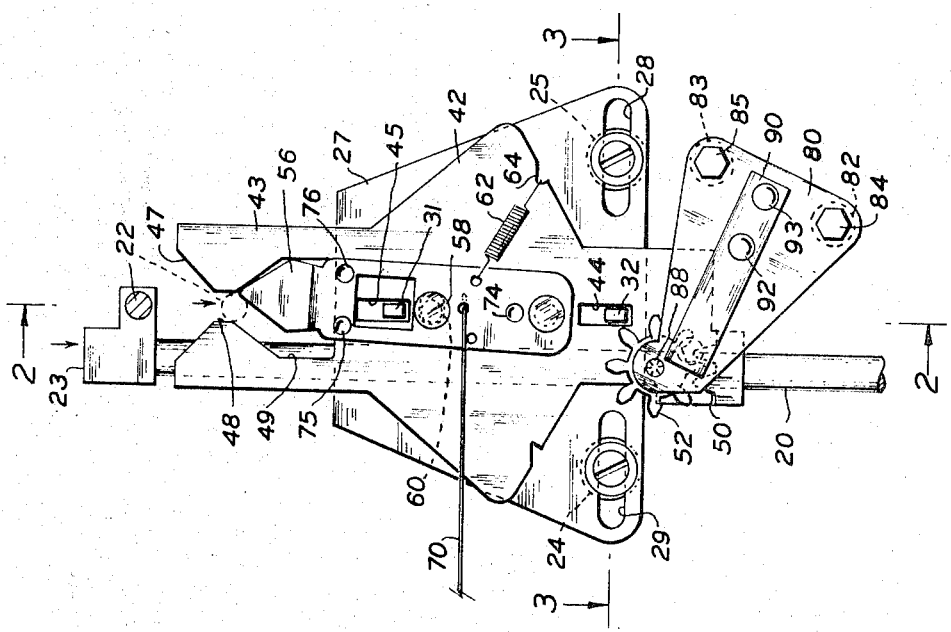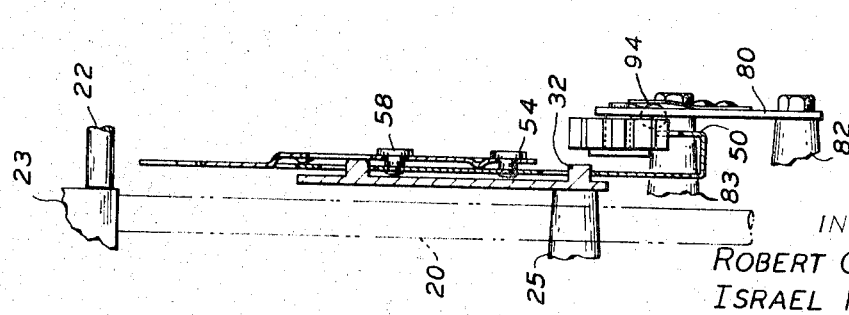

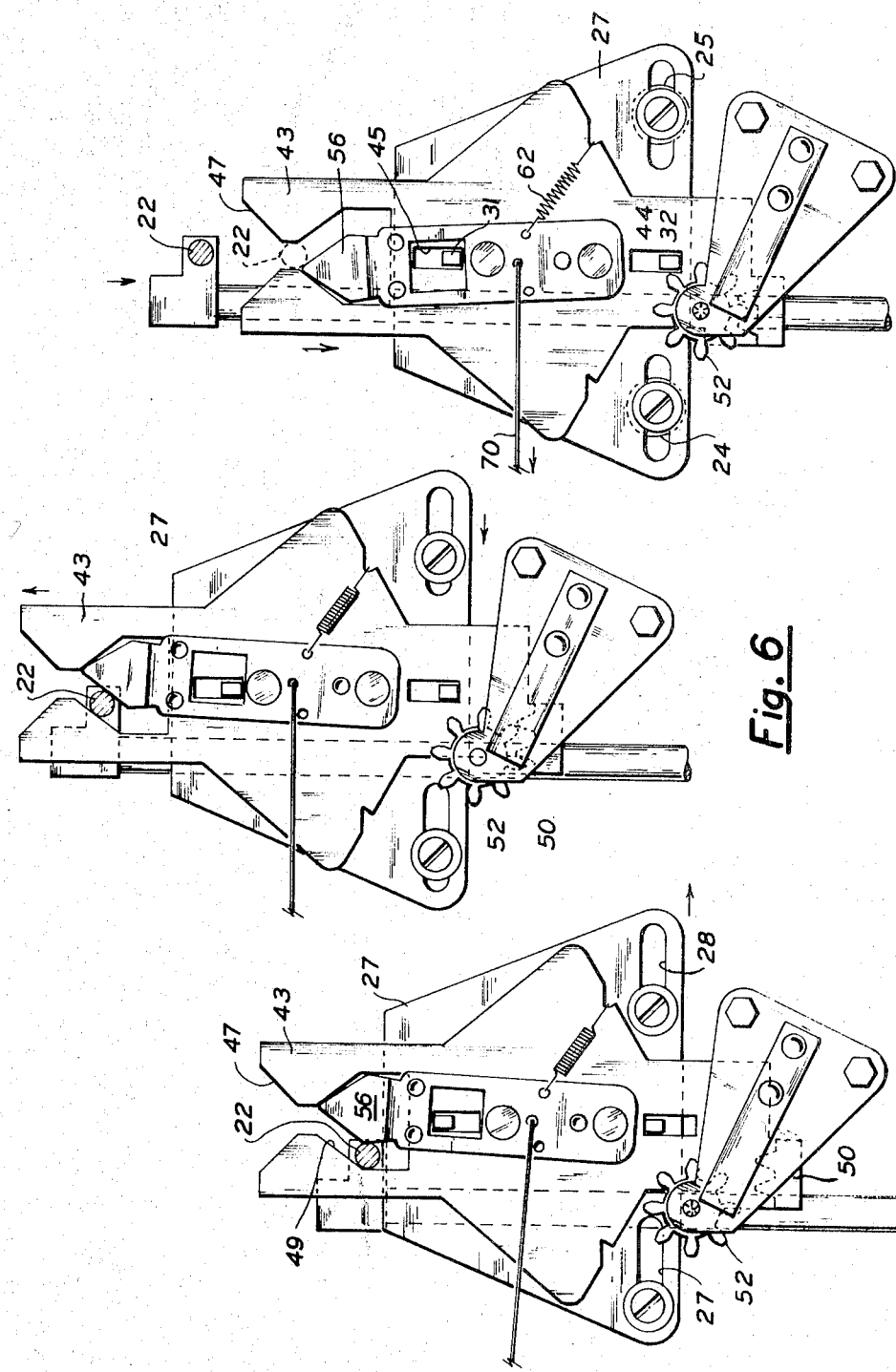

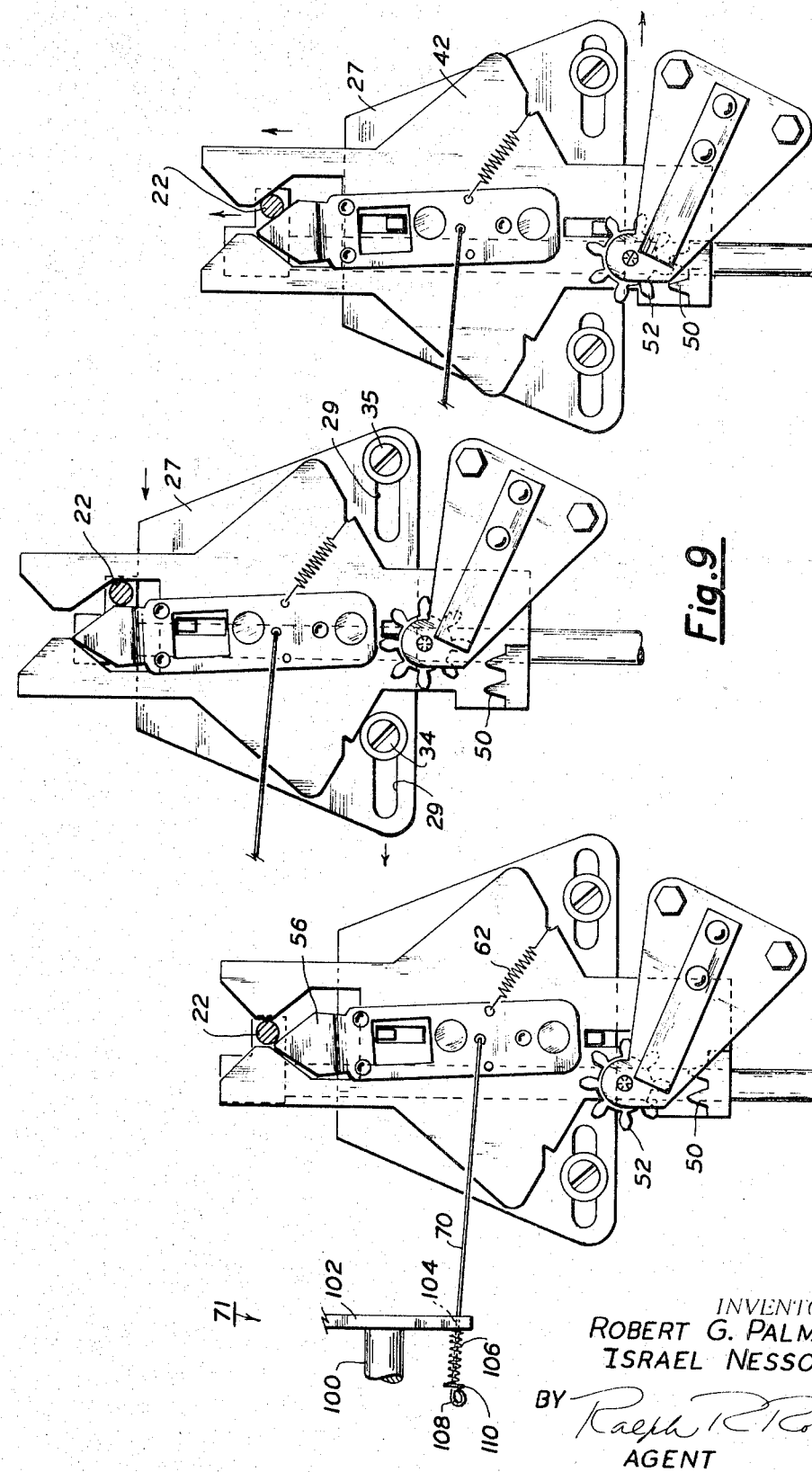

INVENTORS
ROBERT G. PALMER
ISRAEL NESSON

BY *Ralph L. Roberts*
AGENT

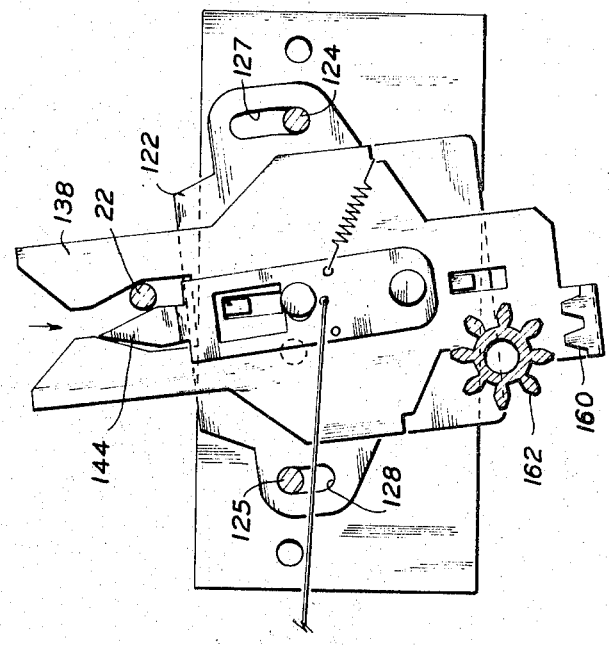
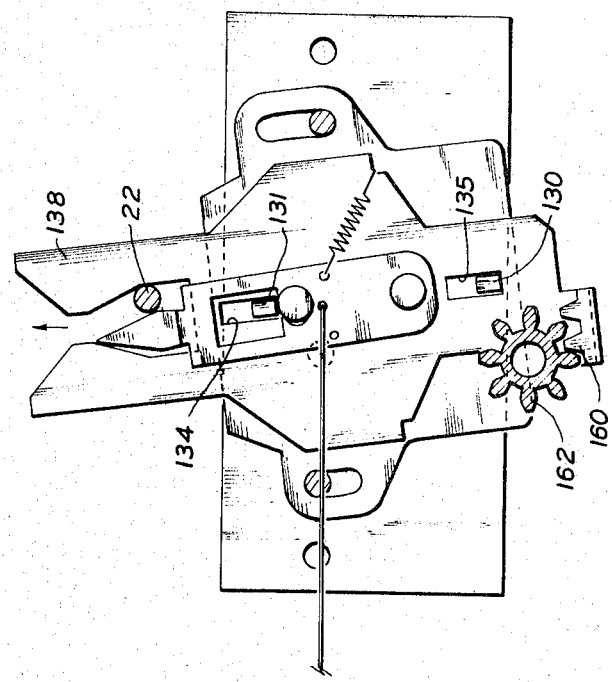

United States Patent Office 3,563,100
Patented Feb. 16, 1971

3,563,100
AUTOMATIC SLIDE TRAY ADVANCING MECHANISM
Robert G. Palmer, Wayne, and Israel Nesson, Hackensack, N.J., assignors to Atlas-Rand Corporation, Paramus, N.J., a corporation of New Jersey
Filed July 30, 1969, Ser. No. 846,138
Int. Cl. F16h *19/04*
U.S. Cl. 74—30                                    23 Claims

ABSTRACT OF THE DISCLOSURE

An automatic slide tray advancing mechanism for use particularly in a slide projector is adapted to successively and selectively move either rectangular or round trays either forwardly or backwardly a distance equal to the spacing of one slide. This movement is powered by the engagement of a pin of a slide transfer apparatus with the tray advancing mechanism and is accomplished with a complete reciprocation of the slide transfer apparatus. A rack member of the tray advancing mechanism is moved in a cycle pattern by the pin of the transfer apparatus and during a portion of this cycle engages a pinion to rotate the pinion one tooth. Ball detent means is provided to maintain the pinion in a slide tray alignment condition except as the pinion is being rotated.

BACKGROUND OF THE INVENTION

Field of the invention

The field of art to which this invention pertains is found in "slide projectors" and particularly in the slide changer or transfer mechanisms.

Description of the prior art

Slide tray advancing or reversing mechanism for use in slide projectors are well known in the art and in their more sophisticated versions a pinion is adapted to engage a rack or tooth profile portions formed on slide trays and with each motion cycle of the slide changer the tray is moved an equivalent of one slide position. These mechanisms are often expensive and often are somewhat erratic in operation or difficult to reverse or shift the direction of motion.

In the present invention there are shown a preferred embodiment and an alternate embodiment of a slide tray advancing mechanism in which a pinion is rotated to engage the toothed portion of a slide tray and as the pinion is intermittently rotated the tray is moved. The positive control and simple construction of these mechanisms provides an effective and inexpensive slide tray advancing mechanism employing a simple means of reversing the rotative direction of the pinion.

SUMMARY OF THE INVENTION

A pinion carried by the projector housing is disposed to engage the teeth portions of a slide tray and as the pinion is intermittently rotated the tray is advanced. A pin member carried by the slide transfer apparatus engages a plate having a rack portion and moves the rack plate in a cycle of motion whereby the rack portion is moved into engagement with the pinion to rotate the pinion an amount equal to one tooth. A spring-biased ball detent engages the pinion teeth to position the pinion when it, the pinion, is not being moved by the rack portion. The positioning of a tongue member carried by the rack plate with respect to the actuating pin of the slide changer determines the direction of rotation of the pinion.

In one embodiment, the plate and rack portion thereof is moved in a pair of substantially L-shaped cycle of motions. In an alternate embodiment the plate and rack portion are moved linearly with the slide transfer apparatus and then is moved in an arc around a center intermediate a pair of pivot pins, then is moved linearly and then in another arc to its initial position.

Although the following disclosure offered for public dissemination is detailed to insure adequacy and aid in understanding of the invention, this is not intended to prejudice that purpose of a patent which is to cover each new inventive concept therein no matter how it may later be disguised by variations in form or additions of further improvements. There has been chosen a specific embodiment of the slide tray advancing mechanism primarily for use in a slide projector. This specific embodiment and an alternate embodiment of the advancement mechanism have been chosen for the purposes of illustration and description as shown in the accompanying drawings wherein:

FIG. 1 represents a plan view of the preferred tray advancing mechanism of this invention;

FIG. 2 represents a somewhat diagrammatic side view of the mechanism, partly in section, the view being taken on the line 2—2 of FIG. 1;

FIG. 3 is a partly diagrammatic sectional view of the base plate and support for the mechanism, the view being taken on the line 3—3 of FIG. 1;

FIG. 4 is a plan view of the tray advancing mechanism of FIG. 1 but showing the mechanism in another position of operation;

FIG. 5 represents the plan view of FIG. 4 with the mechanism in a further stage of sequence or position of operation;

FIG. 6 represents the mechanism of FIG. 5 in a still further sequence or position of operation;

FIG. 7 represents the mechanism of FIG. 6 but with the mechanism in a still further sequence or position of operation;

FIG. 8 represents the mechanism of FIG. 1 but with the direction control means shifted to operate the pinion in a reverse manner and with the mechanism in an initial sequence or position of operation;

FIG. 9 represents the mechanism of FIG. 8 in a further sequence or position of operation;

FIG. 10 represents the mechanism of FIG. 9 in a yet further sequence or position of operation;

FIG. 13 represents the mechanism of FIG. 11 in a still further sequence or position of operation, and FIG. 14 represents the mechanism of FIG. 11 in a still later sequence or position of operation.

Figure 12:
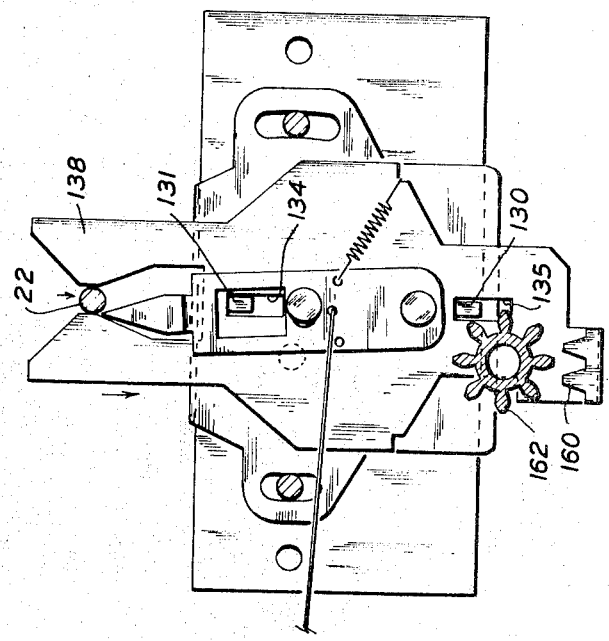
FIG. 12 represents the mechanism of FIG. 11 in a further sequence or position of operation.

In the following description and in the claims various details will be identified by specific names for convenience; these names, however, are intended to be generic in their application. Corresponding reference characters refer to like members throughout the several figures of the drawings.

The drawings accompanying, and forming part of, this specification discloses certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE EMBODIMENT OF FIGS. 1 THROUGH 10

Referring now to the slide tray advancing mechanism particularly as seen in the plan and side views of FIGS. 1 and 2, there is shown a mechanism which provides for a substantially L-shaped path or movement of a rack member as it rotates a tray advancing pinion. In this mechanism a pusher member 20, which is a portion of a slide changer apparatus not shown, is reciprocated by a manual or motor means. This pusher member is carried in a trackway or bearing slides or guides provided in the projector base, and in its reciprocation carries a pin 22 which is attached to and extends upwardly from an end member 23. This pin 22 is moved back-and-forth in a straight line or plane as the pusher is reciprocated to move a slide from a tray to an illuminated projection path, then again to the tray.

Extending upwardly from a base or support, not shown, are support posts 24 and 25 which are best seen in FIGS. 2 and 3. As shown in FIG. 3 these posts are finished at their upper ends to define a common support plane. Each post is provided with a counterbored and threaded hole adapted to receive and seat a shouldered cap screw to be hereinafter more fully described. Slidably carried on the upper ends of these posts is a base plate 27 which, as reduced to practice, is a die casting. In plate 27 there is formed a pair of slots 28 and 29 which, as shown, have a common axis or center line. In a plane at right angles to the center line of the slots 28 and 29 and extending upwardly from the midportion of the plate 27 is a pair of tabs or lugs 31 and 32. The plane of these tabs is midway of the slots.

As diagrammatically seen in FIG. 3, the plate 27 is slidably retained on the ends of posts 24 and 25 by means of shouldered screws 34 and 35. These screws have mounted upon there enlarged shank portions one of a pair of like springs 36 and 37. The springs are compressed from their free length with one end engaging the underside of the head of a screw and the other end one of a pair of washers 38 and 39 so as to urge the plate 27 toward and upon the posts 24 and 25. The motion actuation of this plate on these posts is described in detail hereinafter. A rack-plate 42 of sheet metal is disposed to lay upon the plate 27. A pair of aligned slots 44 and 45 is formed in the plate 42 and provide means for slidably retaining the rack-plate so as to move transversely of the plane of slots 28 and 29 in base plate 27.

On the upper or inner end of the plate 42 there is formed an extending tongue portion designated as 43, which portion has its end formed with a cutout. This cutout is contoured to provide a chamfered opening 47 of approximately ninety degrees included angle terminating at a passageway 48 sized to slidably retain and pass pin 22 therethrough. From the passageway 48 the opening diverges outwardly on each side of an angle of approximately thirty degrees to the axis line of the passageway to form an enlarged opening 49 having parallel sidewalls. The bottom or rear end of the rack-plate 42 is bent upwardly and then inwardly to terminate in a rack-tooth portion 50 formed in the edge of the inwardly extending portion. This rack-tooth portion has two like teeth sized so as to engage a single tooth of a rotatable pinion 52.

Pivotally retained by means of a headed rivet 54 mounted in a hole in plate 42 is a pointed tongue member 56 which is carried by and lays upon plate 42. A second rivet 58, also mounted in a hole in plate 42, is disposed to enter a slot or clearance hole 60 formed in member 56. This slot or hole 60 is sized and disposed to permit tongue member 56, as it lays on plate 42, to be swung to the left or right to determined limits. A light tension spring 62 has one end formed with a hook, which hook end is engaged in a notch 64 formed in the right edge of member 42. The other end of the spring which is also a hook, is mounted in a hole 66 formed in tongue member 56. The tension developed in mounted spring 62 urges the member 56 to rotate rightwardly or clockwise around rivet 54. A shift rod 70, which has one end attached to a solenoid 71 as seen in FIG. 8 and hereinafter is more fully described, has its rightward end disposed to engage and be retained in a hole 72 formed in the member 56.

To insure free rotational movement of tongue member 56 on plate 42 there are provided downwardly extending dimpled portions 74, 75 and 76 as identified on FIGS. 2 and 4. These dimples are formed in member 56 so as to provide ball glides, permitting the member 56 to be swung or moved with a minimum of friction on plate 42. The dimpled portions also provide a determined spaced relationship of the tongue member 56 from the plate 42 as seen in FIG. 2. This permits attachment of spring 62 and rod 70 to the holes in tongue member 56. The forward pointed end 78 of tongue member 56 is bent from the plane of the body portion of member 56 so that when mounted the forward end is in the same plane as tongue portion 43.

Referring still to FIGS. 1 and 2, it is to be noted that guide plate 80 is carried upon posts 82 and 83 extending upwardly from the base. Plate 80 is removably mounted on the ends of posts 82 and 83 by means of cap screws 84 and 85. From the posts the plate 80 extends leftwardly and inwardly to provide a support for shaft 88 which rotatably carries the pinion 52. A flat spring member 90 is carried by plate 80 and has one end attached by means of rivets 92 and 93. The left or free end of spring member 90 is disposed to engage and urge a ball 94 toward the pinion 52. This ball is retained in a hole in plate 80 and, as thus positioned, engages the teeth of the pinion to act as a detent against unwanted rotation and for the positioning of the pinion 52.

Referring particularly to FIG. 8, it is to be noted that a solenoid 71 carries on its plunger 100 an arm member 102 which in one end has a hole 104 in which the shift rod 70 is carried. A compression spring 106 is carried on the rod 70 which has its leftward end curled at 108 to provide a stop for a washer 110. Spring 106 is mounted between washer 110 and member 102 to provide the necessary bias to enable the solenoid 71, when it is moved to the left, to move the arm 70 to shift the tongue member 56 counterclockwise against the bias of spring 62 to the position shown in FIG. 8.

When the solenoid 71 is in a non-actuating condition, the spring 62 urges and moves tongue member 56 to shift or move clockwise to the condition of FIG. 1.

OPERATION OF THE APPARATUS OF FIGS. 1 THROUGH 10

With tongue member 56 in the rightward position shown in FIG. 1, the pin 22, as it is moved in the direction of the arrow, enters the chamfered cutout 47 and engages the leftwardly sloped end of tongue member 56. This condition occurs when the pin reaches the position shown in phantom outline. The pin 22, as it continues to move forwardly, moves to the position of FIG. 4 and pushes the plate 42 in the direction shown by the arrows. Plate 42 is moved by the pin until the tabs 31 and 32 engage the upper or inner ends of the slots 44 and 45 to cause the rackplate 42 to stop its forward movement on plate 27. In this condition, it is to be noted that the rack-tooth portion 50 of plate 27 has been moved from engagement of the teeth of the pinion 52. However, the pinion 52 is still maintained in the desired position by means of the ball detent 94 and its engagement with two adjacent teeth of the pinion.

Referring next to FIG. 5, it is to be noted that the pin 22 as it continues to move forwardly, has now entered the inner slot portion 49 of the tongue member portion 43 and has engaged the side of the tongue member 56 to cause the assembly carried by plate 27 to move rightwardly as indicated by the arrows until the movement of the plate 27 is stopped by the leftward ends of the slots 27 and 28 as they engage shoulder screws 34 and 35. With this movement the rack-tooth portion 50 has been shifted to the right-hand side of the previously engaged tooth of the pinion 52.

Referring next to FIG. 6, there is shown a later portion of the movement cycle wherein the pin 22, now on the outward portion of its stroke, engages the inwardly sloped edge portion of cutout 49 in tongue member portion 43 to cause the plate 42 and all portions thereon to be moved outwardly to bring the rack portion 50 into engagement with the teeth of the pinion 52. As the pin 22 engages the slope of opening 49, the moving pin 22 causes plate 42 and base plate 27 to be moved leftwardly in the direction shown by the arrows. As the rack-tooth portion 50 engages the teeth of the pinion 52, it causes the pinion to move clockwise a distance of one tooth. The leftward movement of the plate continues until it is in the condition and position of FIG. 1 with the pin 22, as it exits from the opening 48, causing the pinion 52 to be advanced one tooth.

To cause a reverse action or rotation of the pinion 52, the tongue member 56 is shifted by actuation of the solenoid 71. The leftward movement of plunger 100 causes shift rod 70 to be moved leftward, as indicated by the arrow, whereupon the bias of spring 62 is overcome and member 56 is shifted to the condition of FIG. 7. The inward movement of pin 22 into the beveled cutout 47 of tongue portion 43 causes the pin 22 to enter passageway 48 to engage the rightward bevel of the end of tongue member 56. The plate 27 is caused to be moved inwardly until tabs 31 and 32 engage the outward ends of slots 44 and 45. As seen in FIG. 8, this limit is reached and the rack-tooth portion 50 is now fully disengaged from the pinion 52.

Further inward movement of the pin 22 is seen in FIG. 9 wherein the plate 27 and all portions thereon are cammed to the left, as indicated by the arrow, and as limited by the slots 28 and 29 as they engage the shoulder screws 34 and 35.

Referring next to FIG. 10, it is seen that as pin 22 is moved outwardly, as indicated by the arrow, the plate 42 is also moved outwardly. When the pin 22 enters the sloped path, both plate 42 and plate 22 are moved rightwardly to cause the rack-tooth portion 50 to move into engagement with the tooth portion of pinion 52. This movement causes the pinion 52 to be rotated counterclockwise for a distance of one tooth as the pin 22 is exiting from the passageway 48.

DESCRIPTION OF THE ALTERNATE EMBODIMENT OF FIGS. 11 THROUGH 14

Referring now to an alternate slide tray shifting mechanism as shown in FIGS. 11 through 14, there is seen a base plate or member 120 which carries upon it a pivot plate member 122. This pivot plate is slidably retained on plate 120 by means of a pair of screws, washers and springs similar to those shown as items 34 through 39 in FIG. 3. These screws are identified as screws 124 and 125. The shoulder portions of these screws 124 and 125 engage arcuate slots 127 and 128 formed in plate 122 to permit plate 122 to swing in a restrained arc as limited by the ends of the arcuate slots 127 and 128. Carried upon this plate 122 are tabs or posts 130 and 131 which slidably engage slots 134 and 135 formed in rack plate 138. Rack plate 138, in the manner of previously described plate 42, has a beveled entrance 140 on its extending portion 141. This entrance is disposed to engage pin 22 and be moved by the movement of this pin. The entrance 140 diminishes or tapers to a guideway or slot 142 which is sized to pass pin 22. This slot then enlarges into an opening 143 partially covered by a pointed end portion 144 of a pivotally movable tongue member 146. This member, in the manner above-described for tongue member 56, is pivotally carried and retained by a rivet 150 mounted in a hole formed in the rear portion of rack plate 138. The forward or free portion of the member 146 is restrained in its swing by means of a rivet 152 which is mounted in rack plate 138 and passes through a slot 154 in member 146 to define the swing movement of the member 146. As described in regards to FIG. 1 above, spring 62 urges tongue member clockwise and shift lever 70 is used to move tongue member 146 counterclockwise. Upon the lower or outer portion of member 146 there is formed a rack portion 160 disposed to engage the teeth of a pinion 162.

OPERATION OF THE APPARATUS OF FIGS. 11 THROUGH 14

Figure 11:
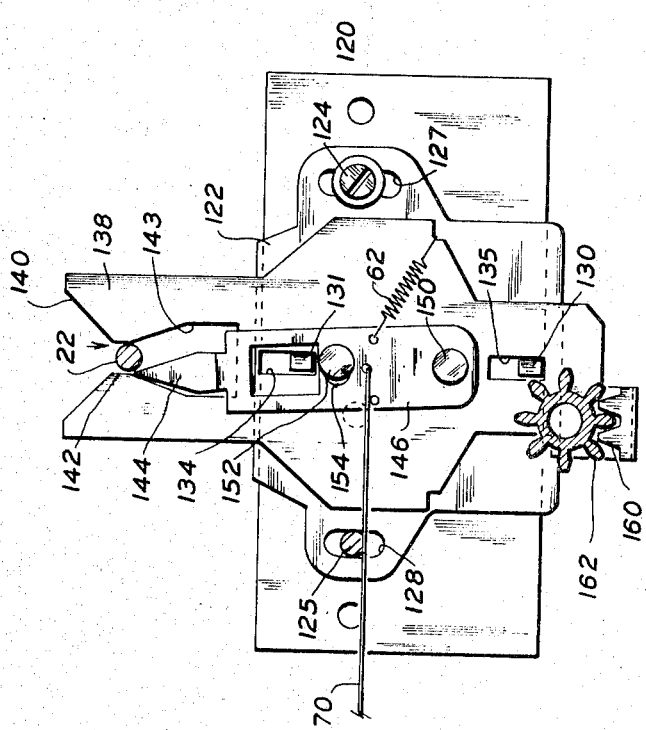
FIG. 11 represents an alternate embodiment of the tray advancing mechanism of FIG. 1 wherein the pinion- actuating rack plate is pivoted instead of shiftable.

As seen in FIG. 11, it is to be assumed that pin 22 has moved from a disengaged condition into the slot or passageway 142 and that the rack portion 160 is engaged with a tooth of pinion 162 which is diagrammatically shown in section. As shown, the shift lever 70 has been moved to the left, as indicated by the arrow, so that the pin 22 as it enters the slot or guideway 142 is brought in way of the rightward side of the pointed end portion 144 of tongue member 146. The pin 22 is also in sliding engagement with the rightward edge of opening 143 in rack plate 138.

Referring next to FIG. 12, it is seen that pin 22, as indicated by the arrow, has been moved further outwardly to push rack plate 138 outwardly and causing rack portion 160 to disengage from pinion 162. The outward movement of plate 138 is, of course, limited by the pins 130 and 131 as they reach the upper or inner ends of slots 134 and 135 of and in member 138.

Referring next to FIG. 13, it is seen that as pin 22 is advanced further inwardly it causes a camming actuation of tongue member 146 with plate 122 being caused to swing around screws 124 and 125 until the ends of the arcuate slots 127 and 128 engage the shoulder of screws 124 and 125. In this condition the rack portion 160 has been shifted from its disengaged relation with the pinion 162 as seen in FIG. 12 to a position to the right of the previously engaged tooth.

Referring finally to FIG. 14, it is depicted that an outward movement of pin 22 is in process, as shown by the arrow, and the pivot plate member 122 has been moved outwardly until it reaches the limit established by the engagement of tabs or posts 130 and 131 with the ends of slots 134 and 135. The rack portion 160 is now in engagement with pinion 162. The further outward travel of pin 22 causes a camming actuation of the rack member 138 to swing to the condition of FIG. 11, whereupon the pinion 162 will have been rotated one tooth in a clockwise condition.

Of course, with the solenoid in a disengaged condition, the tension of spring 62 will cause member 146 to be shifted to a rightward side of slot 143, whereupon the inward and outward cycling movement of pin 22 causes the pinion 162 to be rotated in a counterclockwise direction with the pinion being rotated the distance of one tooth with each complete reciprocation of the pin.

It is, of course, realized that the teeth of the pinion 162 are disposed in the projector so as to engage either a rectangular or rotary tray having a rack configuration thereon with the rack disposed to engage the teeth of either the pinion 52 or 162 and with each advance of the pinion an amount of one tooth, the slide tray is advanced an equivalent of one slide. The direction of rotation of the pinion as controlled by the actuation of the solenoid 71 and shift rod 70 will determine whether the slide tray moves forwardly or rearwardly. Whether the slide tray is rectangular or round is merely a matter of selection.

In the showing of FIGS. 11 through 14, the pinion detent apparatus shown in FIG. 1 is absent. It is contemplated that this detent apparatus or an alternate detent apparatus will be provided. As an alernate arrangement, a flat spring with a V-shaped portion may be mounted on the projector base with the V-shaped portion disposed to engage the pinion teeth to precisely position the pinion except and during the rotation of the pinion.

Terms such as "left," "right," "inward," "outward," "in," "out," "clockwise," "counterclockwise" and the like are applicable to the embodiments shown and described in conjunction with the drawings. These terms are merely for the purpose of description and do not necessarily apply to the position in which the slide tray advancing mechanism may be constructed or used.

Protection by Letters Patent of this invention in all its aspects, as the same is set forth in the appended claims, is sought to the broadest extent that the prior art allows.

What is claimed is:

1. A slide tray moving mechanism for use in slide projectors, viewers and the like, said mechanism adapted to selectively move a slide tray either forwardly or rearwardly a distance equivalent to the spacing of the stored slides with a complete reciprocation of a slide transfer apparatus, the tray moving mechanism including: (a) a guideway engaging member carried by and moved with a slide pusher of a slide changer apparatus, the engaging member being reciprocably moved in a determined path; (b) a support; (c) a base plate carried by the support, said plate movable in a plane and in a defined path; (d) a rack plate slidably carried by and movable on the base plate, the rack plate having a rack-tooth portion with at least two teeth thereon, and having another portion with a track guideway adapted to be entered and engaged by the guideway engaging member; (e) means for establishing movement of the rack plate to and in a reciprocation path of determined extent and plane as the rack plate is moved on the base plate; (f) a tongue member pivotally carried by the rack plate and disposed to be moved to one of two limits of position whereby the tongue member cooperates with the guideway portion of the rack plate to be engaged by the guideway engaging member during its reciprocation to cause the rack plate and positioned tongue member to be selectively moved in either a clockwise or counterclockwise cycle of movement, and (g) a pinion having teeth compatible with the teeth of the rack-tooth portion, said pinion rotatably carried by a fixed support, and positioned to engage the rack portion of the rack plate during a portion of its cycle of movement to rotate the pinion a distance of one tooth.

2. A slide tray moving mechanism as in claim 1 in which the defined path of the base plate is determined by a pair of like slots formed in the base plate each slot being engaged by one of a pair of shoulder means carried by the support.

3. A slide tray moving mechanism as in claim 2 in which the slots are straight with the center lines thereof lying in a common plane and in which the shoulder means are shoulder screws mounted in threaded holes formed in posts extending upwardly from the support, and in which there is provided means for preventing unrestrained and unwanted movement of the base plate.

4. A slide tray moving mechanism as in claim 3 in which the means for preventing unrestrained and unwanted movement of the base plate is a biasing means for urging the base plate into a determined frictional relationship with the support surfaces of the posts.

5. A slide tray moving mechanism as in claim 2 in which the means for establishing the path of movement of the rack plate on the base plate is a pair of aligned slots of determined length formed in the rack plate said slots disposed to be engaged by a spaced pair of upstanding tabs carried by the base plate, and to be laterally retained by the tabs while moving longitudinally therealong.

6. A slide tray moving mechanism as in claim 5 in which the guideway engaging member is a pin carried on the slide pusher and in which the track guideway is a cutout formed in the rack plate, the cutout having a chamfered opening tapering to a passageway sized to slidably pass the pin therethrough after which the cutout diverges outwardly to provide an opening having substantially parallel side walls, and in which the free end of the tongue member is contoured so that when swung to one limit of movement the tongue and cutout are in a spaced array to provide therebetween a defined path and guideway for the pin.

7. A slide tray moving mechanism as in claim 6 in which there is provided a tension spring having one end attached to the tongue member and the other to the support so as to urge the contoured end of the member to a first one side of the cutout and in which there is provided a shift rod attached to the tongue member, and there is provided means for moving the shift rod counter to the urging of the tension spring so as to move the tongue member to the other second side of the cutout to provide a mirror image path and guideway for the pin.

8. A slide tray moving mechanism as in claim 7 in which the means for moving the shift rod is a solenoid and in which the shift rod is resiliently connected to the solenoid to accommodate any overtravel of the plunger of the solenoid.

9. A slide tray moving mechanism as in claim 7 in which the means for limiting the swing of the tongue member to its two limits of movement includes an opening of determined extent formed in the tongue member and an engaging means mounted in the rack plate with the engaging means passing through and engaging the opening in the tongue member.

10. A slide tray moving mechanism as in claim 9 in which the opening in the tongue member is a slot and in which the engaging means is a rivet.

11. A slide tray moving mechanism as in claim 2 in which there is provided a ball detent means disposed to resiliently urge a ball into engagement with adjacent teeth of the pinion the ball being positioned so that in detent engagement it precisely positions the teeth of the pinion.

12. A slide tray moving mechanism as in claim 2 which the slots in the base plate are arcuate in shape and in which the shoulder means is a pair of shoulder screws each mounted in a threaded hole in a support portion extending upwardly from the support, said shoulder screws disposed so as to permit the base plate to be rotated around a determined center and in a selected plane.

13. A slide tray moving mechanism as in claim 12 in which there is provided means for preventing the unrestrained and unwanted movement of the base plate.

14. A slide tray moving mechanism as in claim 13 in which the means for preventing unrestrained and unwanted movement of the base plate is a biasing means for urging the base plate into a determined frictional relationship with the support surfaces of the posts.

15. A slide tray moving mechanism as in claim 12 in which the means for establishing and defining the movement of the rack plate on the base plate is a pair of aligned slots in the rack plate, said slots disposed to engage a spaced pair of upstanding tabs carried by the base plate, the rack plate when mounted on the tabs being laterally retained by the tabs substantially midway of the arcuate slots in the base plate with the rack plate movable longitudinally along said tabs.

16. A slide tray moving mechanism as in claim 15 in which the guideway engaging member is a pin carried on the slide pusher and as the pusher is reciprocated the pin is brought in way of the rack plate and the tongue member, and in which the track guideway is a cutout formed in the rack plate, the cutout having a chamfered opening tapering to a passageway sized to slidably pass the pin therethrough after which the cutout diverges outwardly to an opening with substantially parallel side walls, and in which the free end of the tongue member is contoured so that when swung to one limit of movement, the tongue and cutout are in a spaced array providing for a defined path and guideway for the movement of the pin therethrough.

17. A slide tray moving mechanism as in claim 16 in which there is provided a tension spring having one end attached to the tongue member and the other to the support so as to urge the contoured end of the tongue member to a first one side of the cutout and in which there is provided a shift rod attached to the tongue member and there is provided means for moving the shift rod counter to the bias provided by the tension spring so as to move the tongue member to the other second side of the cutout to provide a mirror image path and guideway for travel therethrough by the pin.

18. A slide tray moving mechanism as in claim 17 in which the means for moving the shift rod is a solenoid and in which the shift rod is resiliently connected to the solenoid to accommodate any overtravel of the solenoid.

19. A slide tray moving mechanism as in claim 17 in which the means for limiting the swing of the tongue member to its two limits of movement includes an opening of determined extent formed in the tongue member and an engaging means is mounted in the rack plate with the engaging means passing through and engaging the opening in the tongue member.

20. A slide tray moving mechanism as in claim 19 in which the opening in the tongue member is a slot and in which the engaging means is a rivet.

21. A slide tray moving mechanism as in claim 12 in which there is provided a pinion detent means for successively positioning a tooth of a pinion at a determined position until and during rotation of the pinion.

22. A slide tray moving mechanism as in claim 21 in which the pinion detent includes a ball carried in a support plate fixedly mounted on the support and in which a biasing means is adapted to resiliently urge the ball toward and into engagement with two adjacent teeth of the pinion.

23. A slide tray moving mechanism as in claim 21 in which the pinion detent includes a flat spring having one end fixedly mounted and with a V-form on the free end of the spring, the V-form disposed to engage two adjacent teeth and determinedly position the pinion.

References Cited

UNITED STATES PATENTS

| | | | |
|---|---|---|---|
| 1,031,194 | 7/1912 | Murdig et al. | 74—30 |
| 3,006,200 | 10/1961 | Woodhead | 74—30 |
| 3,165,971 | 1/1965 | Zillmer et al. | 353—116 |
| 3,218,922 | 11/1965 | Mahoney, Jr. | 353—116 |
| 3,353,290 | 11/1967 | Councilman | 40—79 |

FRED C. MATTERN, JR., Primary Examiner

W. S. RATLIFF, JR., Assistant Examiner